July 30, 1929.  A. LAVER ET AL  1,722,381
ATTACHMENT FOR LAWN MOWERS
Filed Feb. 17, 1928
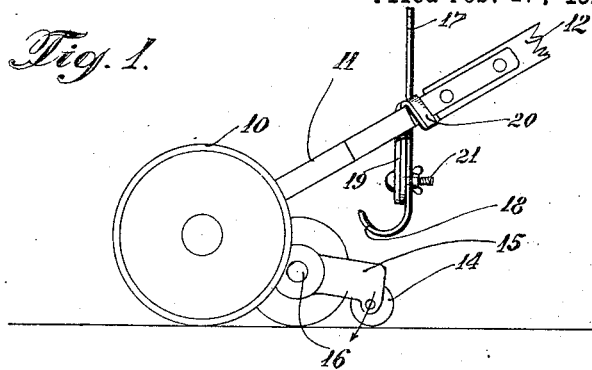
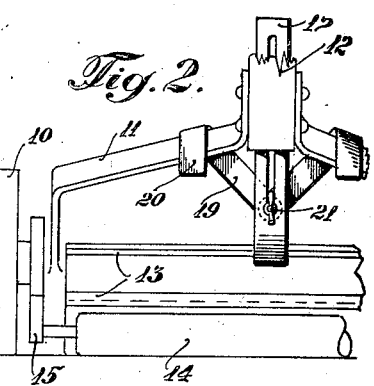
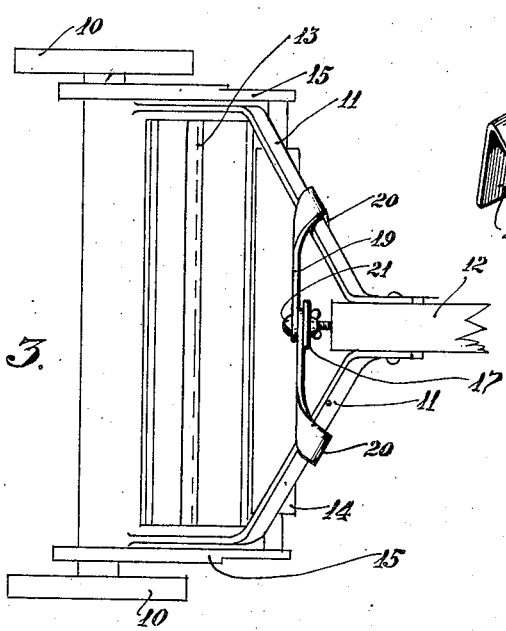
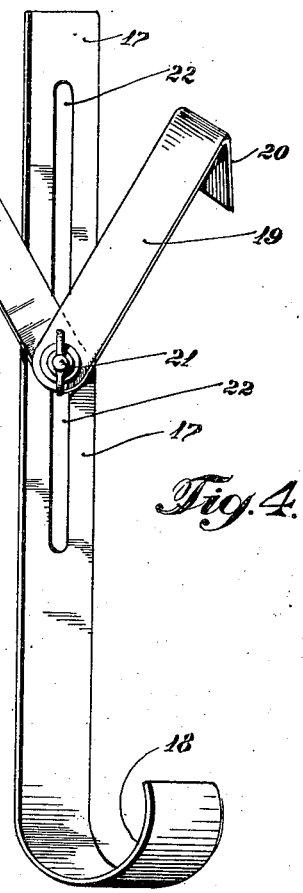
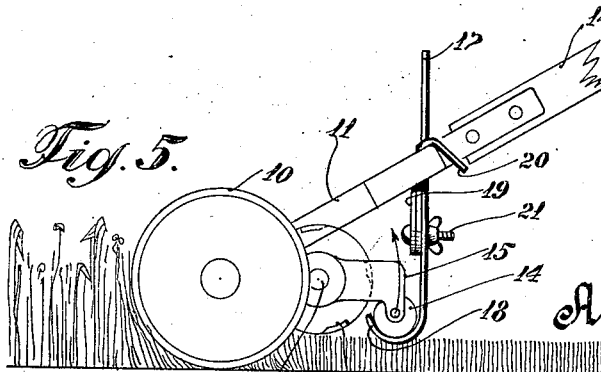
INVENTOR
Arthur Laver & S. Davidson Patented July 30, 1929.

1,722,381

UNITED STATES PATENT OFFICE.

ARTHUR LAVER, OF CALDWELL, AND GEORGE DAVIDSON, OF MONTCLAIR, NEW JERSEY.

ATTACHMENT FOR LAWN MOWERS.

Application filed February 17, 1928. Serial No. 254,956.

The present invention relates to an improvement in an attachment for lawn-mowers.

Among the salient objects which the invention has in view are: To provide means for varying the distance of the cutting element of the lawn-mower from the ground so that the grass may be cut at any desired length; to provide this means in the form of an attachment which may be readily and conveniently slipped on the lawn-mower and taken off easily and without difficulty; to provide an attachment having means for lifting the cutting element of the lawn-mower and adjustable to vary the distance of the cutting element from the ground in order that the grass may be cut in various lengths and at any desired length; and generally to provide an improved attachment for a lawn-mower which is adjustable and functions to regulate the length of the grass cut.

In the drawings:

Figure 1 is a side elevational view of a lawn-mower equipped with the novel attachment of the present invention;

Figure 2 is a rear elevational view of the lawn-mower equipped with our attachment;

Figure 3 is a view of the lawn-mower with attachment in place, looking down on the top thereof;

Figure 4 is a perspective view of the novel attachment of the present invention;

Figure 5 is a side elevational view of the lawn-mower and attachment, showing the manner in which the attachment functions to regulate the length of the grass cut by the lawn-mower.

It is frequently desirable in the operation of lawn-mowers to provide for varying the cutting effect of the lawn-mower and for varying the length of the grass cut. The customary form of lawn-mower includes an element, generally rotatable and carrying cutting blades which are passed over the grass and function so as to cut the grass in a well-known manner. In order to provide for regulating the length of grass cut, this invention provides a means for raising and lowering the cutting element, which of course varies the length of the grass cut. The means of the present invention finds particular utility where the lawn-mower is being operated over rough and uneven ground for the cutting element may be elevated sufficiently to pass over the uneven spots without damage being caused to the cutting element by contact with such uneven spots or imperfections such as stones or the like present on the ground. The present invention also finds utility in application in numerous instances where it is desired to have the grass cut at a predetermined and definite length, such as fields of athletic endeavor and the like.

Referring to the drawings, there is disclosed a lawn-mower of a conventional and well-known character which comprises the customary wheels, 10, which are run along the ground and to which is secured a yoke, 11, terminating and carrying the upwardly extending rod, 12, for the handle, which is pushed by the operator. Associated with the wheels is a cutting element, 13, comprising rotatable blades which operate against the grass over which they are passing and serve to cut the grass. This rotatable element is weighted down by a heavy roller 14, which is secured to the shaft of the wheels, 10, by arms, 15. The rotatable cutter is supported on a shaft 16 situated intermediate the lengths of the arms, 15, and consequently the elevation of the cutting wheel off the ground is determined by the elevation of the roller, 14, and movement of the roller, 14, vertically communicates a corresponding movement to the cutter. Usually the roller rests upon the ground and by virtue of its weight maintains the cutter in close proximity to the ground and at a constant distance therefrom so that the length of grass cut by the cutter is practically constant. According to the present invention, however, an attachment is provided for the lawn-mower whereby the roller 14 may be set at various elevations and consequently the cutter may be set at various elevations and will function to cut grass of various lengths.

The attachment of this invention in its preferred form comprises a strip of metal, 17, which is curved at its lower end as indicated at 18 to provide a portion for engagement underneath the roller 14 and on which portion the roller is supported. The strip 17 is adjustably mounted on the lawn-mower and to this end two link members 19 of sheet metal are provided, having bent portions 20 for engagement with the yoke 11 of the lawn-mower and pivoted together at 21 by an adjusting nut which extends through an elongated slot 22 in the strip of metal. The adjusting screw bears against the end of the rod 12 and when tightened acts to force the strip 17 and links 19 carried thereby and associated therewith away from the end of the rod 12 so that the bent over portions 20 of said links are forced firmly against the yoke 11 and the result is that the attachment is maintained firmly in position in service, although it may easily be removed by loosening the nut. This nut is preferably such as to be conveniently manipulated by hand and does not require the use of a tool to tighten or loosen it. It will be seen that when the attachment is placed in service upon the lawn-mower, the portion 18 thereof engages underneath the roller 14 and maintains the roller elevated and consequently the cutting element is elevated also, the elevation corresponding to the adjustment of the attachment. By virtue of the provision of the elongated slot of the strip 17, the portion 18 of said strip may be made to assume an adjusted position varying from a considerable elevation so that by adjusting the same the cutting element may also be made to assume a variety of elevated positions and the length of grass cut may vary within wide limits. As pointed out, the attachment is maintained firmly in service position on the lawn-mower but may be removed and put in place very simply merely by manipulation of the nut and this attachment does not require any alteration or changes in the lawn-mower, being capable of application to the usual and standard type of lawn-mower.

From the foregoing description, it becomes apparent that the attachment of this invention is adapted to change the elevation of the cutter to any desired extent or degree so that the lawn-mower may function to cut grass of any desired length. A particular object of the invention resides in the fact that the lawn-mower may be employed in cutting very rough and long grass, as it may be run over the grass several times with the cutter at varying elevations, functioning to cut the grass in small amounts successively, and the work involved upon the cutter is not excessive in operation. As already pointed out, the lawn-mower is also adapted to be operated over ground which is rough and uneven, as the cutter may be elevated to any desired extent to avoid the rough spots which would tend to cause it injury should they come in contact with it. The attachment of this invention is further of such a character as to be conveniently applied, practically to all standard makes of lawn-mowers and can be sold as a unit separate from the lawn-mower and adapted for application to practically every lawn-mower on the market.

It will be appreciated that various changes in the specific construction shown may be resorted to in the practise of the invention and no limitations are to be imposed upon this invention other than necessitated by the prior art and the scope of the appended claims.

Claims:

1. In combination with a lawn-mower comprising wheels adapted to run over the ground, a heavy roller trailing in back of said wheels and adapted to rest on the ground, a rotatable cutting element, arms pivotally associated with the wheels, said roller being secured to the rear end of said arms and said cutting element being carried intermediate the roller and wheels, and means associated with the lawn-mower for engaging beneath the roller and adjustable at varying elevations, said means serving to adjust the elevation of the roller and the cutting element, said arms moving on their pivots to permit the adjustment.

2. In combination, the lawn-mower comprising wheels adapted to run on the ground, arms pivotally associated with said wheels, a roller caried at the ends of said arms and trailing behind the wheels, said roller being adapted to rest on the ground, a rotatable cutting element between the roller and the wheels and carried by the arms, a yoke projecting upwardly from the wheels, a rod secured to the ends of the yoke, and means for engaging beneath the roller and adjustable to vary the elevation of the roller from the ground, said arms moving with the roller to vary the distance of the cutting element from the ground.

3. In combination, the lawn-mower comprising a frame with wheels adapted to run on the ground, arms pivotally associated with said wheels, a roller carried at the ends of said arms and trailing behind the wheels, said roller being adapted to rest on the ground, a rotatable cutting element between the roller and the wheels and caried by the arms, a yoke projecting upwardly from the frame, a rod secured to the ends of the yoke, and means for engaging beneath the roller and adjustable to vary the elevation of the roller from the ground, said arms moving with the roller to vary the distance of the cutting element from the ground, said means comprising an element suspended from and carried by the yoke and a claw-like portion associated with said element for engaging beneath the roller, said claw-like portion being connected to said element by adjustable means.

ARTHUR LAVER.
GEORGE DAVIDSON.